United States Patent [19]

Hori et al.

[11] Patent Number: 4,788,412
[45] Date of Patent: Nov. 29, 1988

[54] METHOD OF CONTROL AND APPARATUS FOR HOT-WIRE WELDING

[75] Inventors: Katsuyoshi Hori; Shigeyoshi Kawano; Masahiko Sadakane; Toshiharu Myoga, all of Kure; Toshiaki Takuwa, Yokohama, all of Japan

[73] Assignee: Babcock-Hitachi Kabushiki Kaisha, Tokyo, Japan

[21] Appl. No.: 55,948

[22] Filed: Jun. 1, 1987

[30] Foreign Application Priority Data

May 30, 1986 [JP]  Japan .................. 61-124869
Jul. 4, 1986 [JP]  Japan .................. 61-156253

[51] Int. Cl.⁴ .............................................. B23K 9/10
[52] U.S. Cl. ................... 219/137 PS; 219/130.21; 219/136
[58] Field of Search ............ 219/136, 137.2, 130.21, 219/137 PS

[56] References Cited

U.S. PATENT DOCUMENTS 4,580,026  4/1986  Stol ............................... 219/136
4,614,856  9/1986  Hori et al. .................... 219/137 PS
4,628,182  12/1986  Hori et al. .................. 219/137 PS Primary Examiner—Clifford C. Shaw
Attorney, Agent, or Firm—Antonelli, Terry & Wands

[57] ABSTRACT

A method and an apparatus for controlling the hot-wire welding process is disclosed in which the heating power for a hot-wire is automatically regulated to a proper value. The wire-heating power after fusing of a filler wire by being overheated is set to a level lower than the heating power immediately before wire fusing, and the wire-heating power is again increased gradually from the set value until the wire is fused by being overheated. By repeating this process, the molten state of the filler wire in the hot-wire TIG welding is automatically kept in optimum condition without requiring any operation of the welding operator or his intuition. Further, during the energization of the filler wire, the instant of fusing by overheating of the wire is detected, and the detected signal is used to sharply reduce or suspend the wire current immediately, whereby spatters which otherwise might be caused by fusing of the overheated wire is prevented or greatly reduced, and the adhesion of the spatters to the arc electrode is prevented, thereby permitting a hot-wire welding operation continuously over a long time. Furthermore, a pulsed current is used for heating the filler wire, and the wire terminal voltage during de-energization of the wire is detected, thereby detecting whether the wire is in contact with a base metal. If the wire is not in contact with the base metal, a current is not supplied during the next pulse application period, so that the current is prevented from flowing from a tungsten electrode to the wire while the wire is not in contact with the base metal.

21 Claims, 8 Drawing Sheets

METHOD OF CONTROL AND APPARATUS FOR HOT-WIRE WELDING

BACKGROUND OF THE INVENTION

1. Field of the Invention

The present invention relates to a hot-wire welding process, or more in particular to a method of control and apparatus for a hot-wire welding process in which magnetic arc blow and spatters are eliminated and maintain the heating power of the hot-wire at a proper value automatically.

2. Description of the Prior Art

FIG. 1 shows a configuration of a welding apparatus used conventionally for hot-wire TIG welding process.

A tungsten electrode 2 making up an arc electrode in the TIG welding torch 1 and a base metal 3 are connected to a welding arc power supply 4 directly, and an arc 5 is formed with the tungsten electrode 2 as a negative electrode in an argon shielding gas. A welding filler wire 6 is supplied from a wire feeder 7 through a conduit 8 and a contact tip 9 connected therewith to an arc forming section and is contacted with the base metal 3. The contact tip 9 and the base metal 3 are connected to a wire heating power supply 10. A direct or alternating current is supplied to the filler wire 6 thereby to generate Joule heat, thus improving the melting rate of the filler wire 6.

The optimum molten state of the filler wire 6 in the hot-wire TIG welding process is such that the filler wire 6 is completely molten immediately before entering a molten pool 11 and the molten metal continues to drop without interruption. In such a case, the metal is melted and the molten metal transfers to the molten pool 11 as if hot water is poured from a kettle, thus forming a superior bead 12.

For this purpose, it is necessary to control the filler wire 6 to be energized and heated in the extension e between the contact tip 9 and the base metal 3 in such a manner as to strike a balance between power supplied thereto and the wire melting amount.

In the hot-wire TIG welding process, however, it is conventionally known that with the increase in wire energization current, an electromagnetic force is generated with the arc current, which causes what is called "magnetic arc blow", making the welding difficult.

As a measure against this inconvenience traditionally known and employed from old days as a common technical knowledge, an arc current as high as possible is selected to increase the stiffness of the TIG arc and the wire heating current is set to less than one half of the arc current to heat the wire with AC rather than DC current. In order to increase the wire melting rate, however, it is necessary to increase the wire current. As a result, if a proper arc current is selected for a given object of welding to obtain a wire melting rate of, say, 20 g/min, a magnetic arc blow may occur continuously unless the arc is set to a very short length less than 1.5 mm, thus making the welding work difficult. This conventional method, therefore, has been limited in applications.

In the prior art, the power for heating the wire is controlled in such a manner that while the extension e is kept as constant as possible during the welding work, the wire melting conditions are observed by the welding operator to adjust the wire power in accordance with the wire feed rate, in sole dependence upon the intuition and labor of the welding operator.

In contrast, the U.S. Pat. No. 4,614,856 proposes a method of controlling the applied power to a value matching the wire feed rate by measuring the power applied to the extension e during the welding work.

Specifically, in view of the fact that the amount of heat necessary for melting the wire is proportional to the applied power in principle, the applied power is supplied in proportion to the wire feed rate.

As a result, by manually adjusting the above-mentioned proportionality appropriately, a great variation in extension e or a considerable change in wire feed rate in the welding can be met allowable in a considerable degree.

Even though proper conditions are determined in this way to keep subsequent conditions, the arc current, arc length or the angle of inserting the filler wire 6 into the molten pool 11 cause a change in the amount of heat transferred to the filler wire 6 from the arc 5 or the molten pool 11, so that the melting condition somewhat changes, thereby causing a deviation from the proper meling state.

If the applied power deviates toward an excessive side for the wire feed rate, a so-called spattering phenomenon takes place, and the arc 5 is disturbed with a current passing through the arc between the tip of the filler wire 6 and the base metal 3 or the tungsten electrode 2. These phenomena disturb welding operation very much. In the event that the applied power becomes too small for the wire feed rate, on the other hand, the apparent arc conditions remain substantially unchanged and the welding operator continues to proceed with his work without noticing the condition change, with the result that an unmolten wire 13 is left in the deposited metal 14 often forming a welding defect as shown in FIG. 2. To prevent these troubles, the welding operator is required to observe the molten part of the wire or the arc as frequently as possible during this welding work, checking to see whether the proper welding conditions have been kept to be met while adjusting the applied power. This decision as to whether the proper conditions are maintained depends on the intuition of the welding operator.

SUMMARY OF THE INVENTION

Accordingly, it is the main object of the present invention to provide specific means for solving the above-mentioned problems, or in particular, to provide specific means for maintaining the melting condition of the filler wire at an optimum state fully automatically in the hot-wire TIG welding process without relying on the intuition or requiring any operation by the welding operator.

A further object of the present invention is prevented from being formed or reduced greatly with hot-wire to provide a welding apparatus in which spatters are melting under excessive heating, thereby making hot-wire welding possible continued over a long time.

In order to achieve the above-mentioned main object, according to the present invention, there is provided a method of controlling a hot-wire welding apparatus configured of an arc power supply and a wire-heating power supply, in which the wire-heating power after fusing the wire by excessive heat is set lower than the heating power immediately preceding to the fusing of the wire, and the wire-heating power is again gradually increased from the setting until the wire is again fused under excessive heat.

Further, according to the present invention, there is provided a hot-wire welding apparatus configured of an arc power supply and a wire-heating power supply, which comprises a wire-heating power control circuit whereby a wire-heating power after fusing of the wire under excessive heat is set lower than the heating power immediately preceding to the fusing, and the wire-heating power is then gradually increased from the setting until the wire is again used under excessive heat.

Also, in order to achieve the further object of the invention, there is provided a hot-wire TIG welding apparatus comprising a circuit for detecting the time point immediately before fusing or the moment of fusing of the wire during energization of the filler wire and a circuit for sharply reducing or interrupting the energization of the wire current immediately upon receipt of a signal from the fusion detector circuit.

BRIEF DESCRIPTION OF THE DRAWINGS

Preferred embodiments of the present invention will now be described in conjunction with the accompanying drawings, in which.

DESCRIPTION OF THE PREFERRED EMBODIMENTS

An embodiment of the present invention will be explained in detail below with reference to the accompanying drawings.

Figure 3:
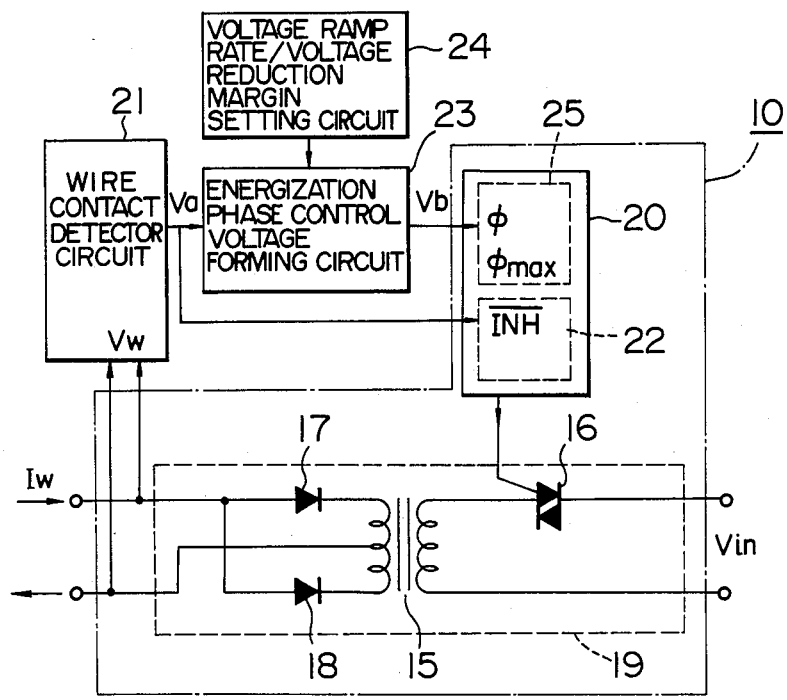
FIG. 3 is a diagram showing a first embodiment of a wire-heating power supply and a control circuit according to the present invention.

FIG. 3 shows an embodiment of a wire-heating power supply and a control circuit according to a first embodiment of the present invention. This first embodiment uses a triac system which can be configured at a very low cost as a wire-heating power supply for producing a pulse current. This circuit is operated as a power supply replacing the wire-heating power supply 10 among the component parts of the hot-wire TIG welding apparatus of the prior art shown in FIG. 1.

In this embodiment, as shown in FIG. 3, the primary of a main transformer 15 is connected to a triac 16, and the secondary thereof to a full-wave rectifier circuit including diodes 17, 18, making up a wire-heating current-forming circuit 19. This wire-heating current-forming circuit 19 has the triac 16 controlled by a gate pulse-forming circuit 20 to produce a wire current with the AC power supply of commercial frequency subjected to phase control. In order to prevent continuous magnetic arc blow or mitigate a magnetic arc blow to thereby facilitate the welding work which otherwise would be hampered by the magnetic arc blow, the application of a gate pulse to the triac 16 is always controlled in such a way that a de-energization period lasts from zero degree to 90 degree and from 180 degree to 270 degree in commercial frequency phase. The phase control angle for energizing the triac 16 is thus assumed in the remaining period from 90 degree to 180 degree and from 270 degree to 360 degree to energize the filler wire 6 shown in FIG. 1 in a manner to produce a wire-heating power commensurate with the wire feed rate.

Figure 4:
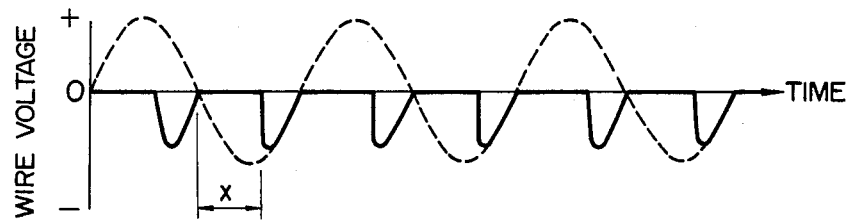
FIGS. 4 and 5 are diagrams showing wire terminal voltage waveforms in FIG. 3 respectively.
Figure 5:
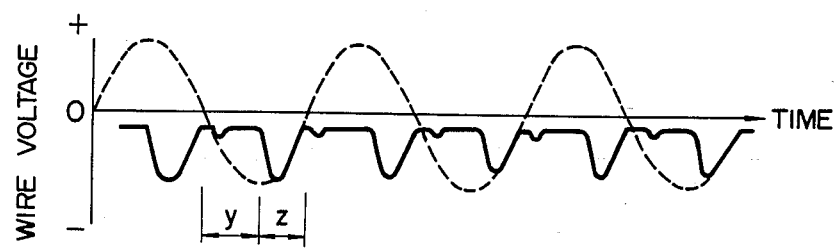

The wire terminal voltage (output terminal voltage) represented by Vw during the wire de-energization period assumes almost 0V as shown in the period x of FIG. 4 when the filler wire 6 is in contact with the base metal 3, and a negative voltage below −1V by detecting the voltage of a plasma flame when the wire tip is away from the base metal 3 and in contact with the arc plasma as shown in the period y of FIG. 5. Taking advantage of this characteristic, a wire contact detector circuit 21 for detecting whether the tip of the wire 6 is in contact with the base metal 3 is configured appropriately. The outpu voltage Va of the wire contact detector circuit 21 takes a "high" (H) level when the wire 6 is in contact with the base metal 3, and a "low" (L) level when it is away from the base metal. This signal is applied to an on-off control circuit 22 in the gate pulse-forming circuit 20 and operates not to form the next energization pulse if the wire 6 is detached from the base metal 3.

The energization phase control voltage-forming circuit 23, on the other hand, is supplied with a signal from the voltage ramping rate voltage reduction margin setting circuit 24, together with an output voltage Va of the wire contact detector circuit 21, and produces a voltage Vb for determining the energization phase of the triac 16 to the energization phase control circuit 25 in the gate pulse forming circuit 20. This output voltage Vb gradually increases when the output voltage Va is high, that is, when the wire 6 is in contact with the base metal 3, while when the voltage Va is reduced to low level (L), that is, when the wire 6 comes away from the base metal 3, the voltage is decreased to a predetermined value.

Figure 6:
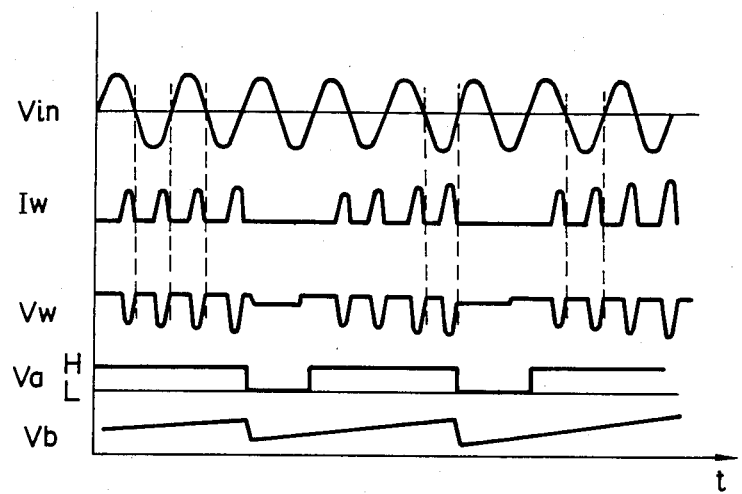
FIG. 6 is a diagram for explaining the control operation in the embodiment of FIG. 3.

FIG. 6 shows changes in the voltage signal and output current with time diagramatically. The energization phase control circuit 25 in the gate pulse-forming circuit 20 controls the firing angle in such a manner as to increase the energization current in accordance with the magnitude of the input voltage Vb. With the increase in the energization current, the resistance of the extension e indicated in FIG. 1 and the wire-heating power determined by the energization current for the extension e naturally increase, and when the applied wire-heating power increases as compared with the wire feed rate, the wire 6 is overheated and molten like a fuse. The wire 6, once molten, comes away from the base metal 3, and the resultant change in the output voltage Vw is detected by the wire contact detector circuit 21, thereby reducing the output Va to low level. As a result, the wire energization is prohibited, and the energization phase control voltage-forming circuit 23 reduces the output voltage Vb by a predetermined value. When the tip of the wire 6 comes into contact with the base metal 3 and the voltage Va rises to high level to resume the wire energization, the power applied to the wire 6 is set to a value slightly lower than the optimum heating power required for the wire feed rate.

In this operation, if the wire feed rate is reduced during the welding work, the wire 6 tends to be overheated, and therefore the wire is fused so frequently that the voltage Vb gradually drops, resulting in the wire-heating power being reduced. If the wire feed rate increase, by contrast, the wire-heating power tends to be insufficient, and therefore, although the wire is not fused, the energization phase control voltage-forming circuit 23 operates to increase the voltage Vb gradually, with the result that the wire-heating power continues to increase until the wire is fused.

According to the present invention, the functions remain the same even when the wire extension e, changes. Specifically, with the increase in the extension e, the resistance value therethrough increases. When the wire-heating power supply has a constant-voltage output characteristic, therefore, the crest value of the current decreases given a constant energization phase, so that the output power decreases, thus making fusing difficult. As a result, the output voltage Vb gradually increases to increase the energization phase, thereby leading to a heating power commensurate with the wire feed rate. When the extension e shortens, by contrast, the resistance value in the extension e is decreased, and for the same energization phase the current crest value increases, causing an excessive applied power to facilitate the fusing Each time of the detachment the voltage Vb drops and the energization phase decreases, with the result that the initial heating power commensurate with the wire feed rate is achieved.

The degree of Vb drop each time of wire detachment, or the rate at which the output voltage Vb increase can be determined by controlling the variable resistor provided in the voltage ramping rate/reduction degree setting circuit 24 for selection and control at a proper value before or during the welding process.

In this manner, the control operation is performed following the changes in wire feed rate and extension e during the welding operation, and therefore, it is possible to keep a value very near to the proper wire heating power automatically.

Figure 7:
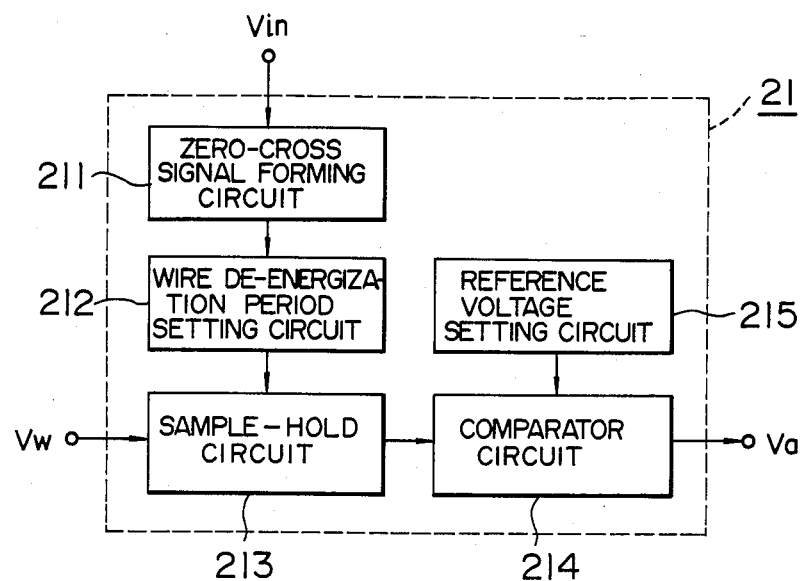
FIG. 7 shows a configuration of a wire contact detector circuit 21 shown in FIG. 3.

FIG. 7 is a diagram showing a configuration of the wire contact detector circuit 21 of FIG. 3.

In FIG. 7, the AC source voltage Vin of commercial frequency is applied to a zero-cross signal forming circuit 211 thereby to form a pulse signal for phase zero. On the basis of this signal, a wire de-energization period setting circuit 212 produces a "high" signal for the period of π/2, during which a sample-hold circuit 213 keeps the wire voltage Vw conducting and applies it to a comparator circuit 214. Then, when the wire energization period is started and the output of the wire de-energization period setting circuit 212 becomes "low", the immediately-preceding value of Vw is held by a sample-hold circuit 213. The comparator circuit 214 compares the signal from the sample-hold circuit 213 with the voltage from the reference voltage setting circuit 215, to determine whether the wire 6 is contact with the base metal 3, and forms an output signal Va.

Figure 8:
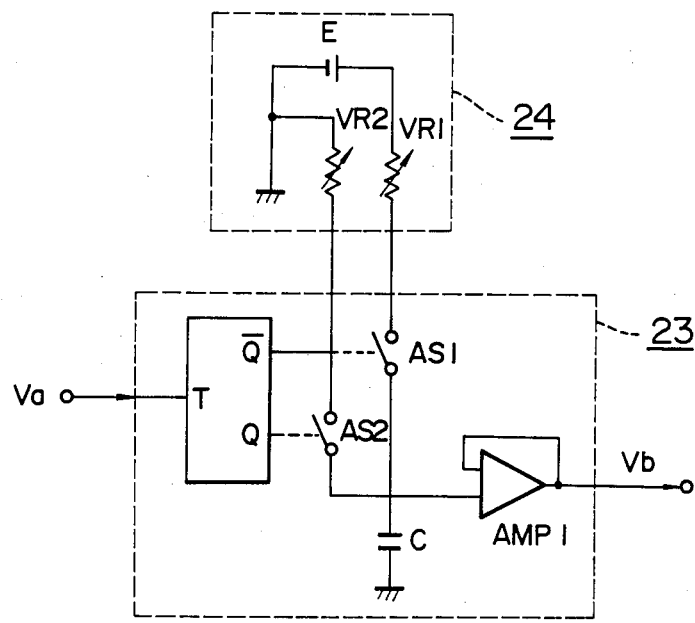
FIG. 8 is a diagram showing a configuration of an energization phase control voltage forming circuit 23 and a voltage ramping rate and voltage reduction margin setting circuit 24 in FIG. 3.

FIG. 8 is a diagram showing a configuration of the energization phase control voltage-forming circuit 23 and the voltage ramping rate/voltage reduction range setting circuit 24 shown in FIG. 3.

In FIG. 8, the output Va of the wire contact detector circuit 21 is applied to a timer T in the energization phase control voltage forming circuit 23. The time T produces a signal Q which becomes "high" when the output Va changes from "high" to "low" level, and a signal $\overline{Q}$ subject to the opposite change. When the signal $\overline{Q}$ is "high", a first analog switch AS1 in the energization phase control forming circuit 23 turns on, so that a low-voltage source E, a first voltage ramping rate control VR1 and a capacitor C ae connected in series thereby to promote the charging of the capacitor C.

Figure 1:
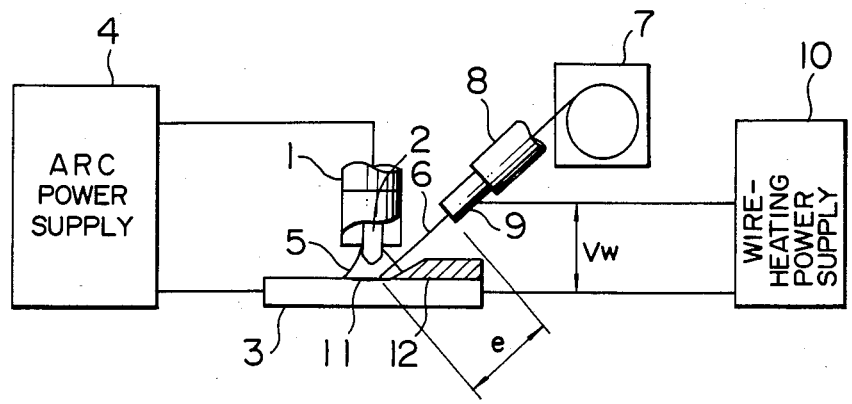
FIG. 1 is a diagram showing a configuration of parts of a hot-wire TIG welding apparatus according to the prior art.
Figure 2:
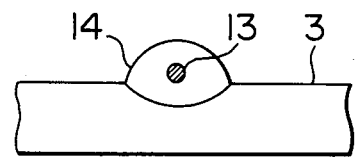
FIG. 2 is a diagram showing sectional view of a welding bead in FIG. 1.

In FIG. 1, when the wire 6 coming away from the base metal 3 is detected to such an extent that the output Va becomes "low", the signal Q becomes "high" during the period $t_0$, and the second analog switch AS2 turns on, so that the capacitor C is grounded through a second voltage reduction range setting resistor VR2 and thus proceeds to discharge, with the result that the voltage across the capacitor C drops. The voltage of the capacitor C is produced as an energization phase control voltage Vb through an amplifier Amp 1 inserted in the energization phase control voltage forming circuit 23.

Figure 9:
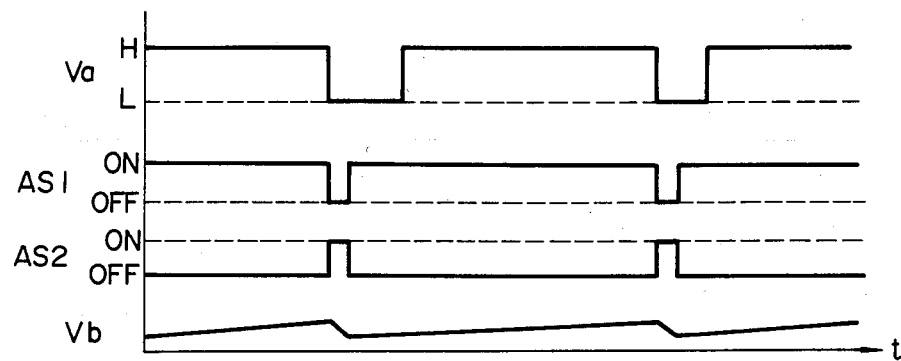
FIG. 9 is a diagram for explaining the operation of the circuits of FIGS. 7 and 8.

FIG. 9 shows the manner in which the output voltage Va, Vb and the analog switches AS1, AS2 change with time.

In the apparatus shown in FIG. 3, the cycle of fusing by overheating the wire 6 depends on mainly the change in the power applied to the wire 6 and the feed rate of the wire 6. In order that the fusing of the wire 6 by overheating may be accompanied by very small spattering, it is desirable to reduce the frequency thereof. For this purpose, in the event that it is necessary to meet rapid changes in extension e or the rate of feed of the wire 6, the rate of increase and the degree of reduction in the voltage V is increased thereby to cause frequent fusing of the wire 6. In the case where a change in the extension e or the feed rate of the wire 6 is not frequent, on the other hand, the increase rate and the degree of drop of the voltage Vb is reduced thereby to reduce the frequency of fusing by overheating of the wire 6. The change in the power applied to the wire 6 is determined normally by manual control of the variable resistor of the voltage ramping rate/reduction range setting circuit 24 before or during the welding process. This control may also be performed automatically by means of a circuit for controlling the wire-heating power in such a manner that the intervals of fusing by overheating of the wire 6 approaches a designated value. In this case, a time interval of fusing by overheating of the wire 6 so predetermined, so that when the actual fusing interval is longer than the predetermined value, the wire-heating power is increased at a higher rate, while if the actual fusing interval is short, the wire-heating power is increased at a lower rate.

In similar fashion, automatic control of the applied power for heating the wire 6 is alternatively possible by a circuit for controlling the wire-heating power in such a way that the interval of wire fusing under excessive heat is adapted to approach a predetermined value, in which an interval of wire fusing by overheating is predetermined and when the actual interval of fusing is longer than the predetermined value, the power for heating the wire 6 is increased by a predetermined amount, while the actual interval is shorter, the wire-heating power is reduced by a predetermined amount.

If a high wire current flows the moment of fusing of the wire overheated, spatters are liable to form. If the wire current is comparatively low below 100A, or no current flows, on the other hand, no spatter is formed. In the case where a wire-heating power supply is used for producing a pulsed current, it is possible to reduce the spatter formed remarkably by use of a circuit for controlling the fusing by overheating of wire or the detachment of the wire from the base metal to occur during the period when the wire current is sufficiently low during or immediately before suspension of wire energization. This is made possible by designating a cycle of wire fusing by overheating and control in such a manner that the occurrence of fusing coincides with the start of the suspension of wire energization.

Further, the method according to the present invention, in which the phenomenon of the filler wire 6 detaching from the base metal 3 or the phenomenon that occurs during detachment of the filler wire 6 from the base metal 3 by heating by energization is detected electrically, is of course applicable, by changing the proportionality constant, to a control apparatus proposed by U.S. Pat. No. 4,614,856 in which the heating power is controlled to produce a wire-heating power by measuring the power actually applied to the extension e and controlling it to a value proportional to the feed rate of wire 6. Although resultant control apparatus is considerably complicated, the advantages are obtained that the response to a sudden change in the feed rate of wire 6 or the extension e is further improved.

In similar manner, power control is also possible by configuring a control circuit by which the square of the effective value of the wire-heating current is proportional to the wire feed rate and the proportionality constant thereof is changed in accordance with the method of the present invention. In this way, the response to an abrupt change in the extension e of the filler wire 6 is performed by the means according to the present invention, and therefore is inferior to the response in the above-mentioned case. In spite of this, the response to the change in wire feed rate remains superior as in the above-mentioned embodiment. The advantage in this case is that the need of detecting the wire voltage from a point very near to the ends of the extension e in order to detect the wire-heating power in the U.S. Pat. No. 4,614,854 described above, which is very troublesome in the welding work, is eliminated.

Figure 10:
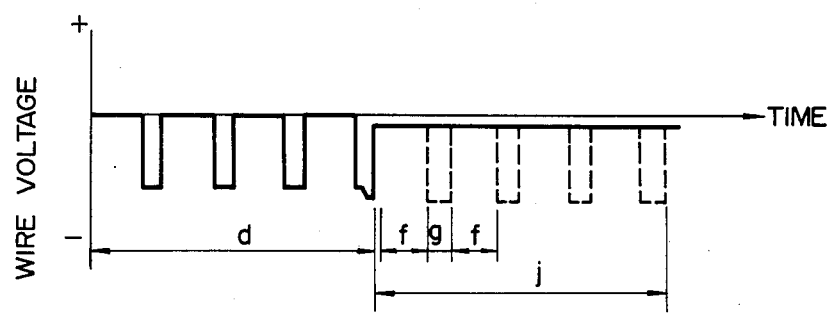
FIG. 10 is a diagram showing a wire terminal voltage in the case where a power supply of inverter type is used for heating the wire according to a second embodiment of the present invention.

The present invention, of which description is made above with reference to a wire-heating power supply with a system using the triac 16, is not limited to such a method, but the invention is applicable to a method using a power supply for pulse energization heating system provided with a wire-heating current suspended for a given period of time. FIG. 10 shows a wire terminal voltage of a system using an inverter-type power supply as a second embodiment of the present invention. During section d in FIG. 10, the steady welding work is proceeding with the wire 6 in contact with the base metal 3 and the voltage remains virtually zero during the wire current suspension. During the period j, the wire 6 is detached from the base metal 3, and during the wire current suspension period (f), the tip of the wire detects the potential in the arc plasma. When the detachment of the wire tip from the base metal according to this invention is detected, the energization at next pulse period (during the section g) is interrupted, thereby preventing the disturbance of the arc.

The foregoing description concerns a method of control to keep condition of almost proper heating power by causing complete overheating of the filler wire to the point of fusing. A fusing frequented by spattering, however, is not desirable. To obviate this, another method of control is proposed, in which the moment immediately before fusing is detected from a change in wire current, wire voltage or output terminal voltage or the wire resistance value determined from it.

Figure 11:
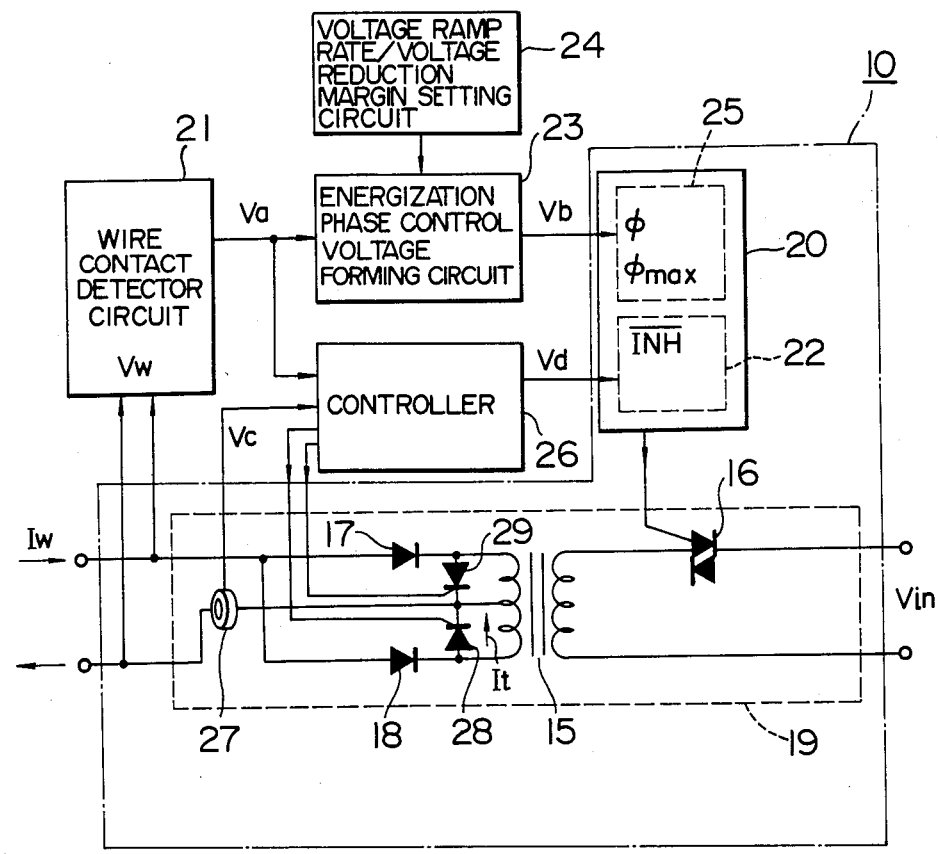
FIG. 11 is a diagram showing a third embodiment of the wire-heating power supply and the control circuit according to the present invention.

FIG. 11 shows a third embodiment of the wire-heating power supply and the control circuit 3 according to the present invention, in which a controller 26 for detecting the condition immediately before fusing is added to the wire-heating power supply and the control circuit included in FIG. 3.

In FIG. 11, the same reference numerals as in FIG. 3 designate the same component parts as in FIG. 3.

In FIG. 11, the controller 26, in response to an output signal Vc of a current differentiation sensor 27 for producing a differentiated waveform of the wire current Iw, detects the condition immediately before fusing from the change in output signal Vc, and sends a firing signal to the gates of thyristors 28, 29 directly coupled to the secondary of the main transformer 15. At the same time, a signal Vd is applied to the on-off control circuit 22 thereby to suspend energization of the triac 16 until the lapse of a predetermined time period. This predetermined time period t is set with reference to the signal Va from the wire contact condition detector circuit 21 as a time length from re-contact of the wire 6 with the base metal 3, if away therefrom, or from the detection of the point immediately before fusing, if not away therefrom, until the wire 6 is fed by 0.5 mm. In this way, the output of the main transformer 15 is shunted into the thyristors 28 and 29 immediately before fusing, resulting in a sharp reduction in output current, so that the overheated wire 6 is fused off sharply in a manner not to form any spatter. Energization is resumed with the wire 6 fully in contact in the molten pool, and the applied power involved is slightly reduced, thereby controlling the heating power in a manner similar to the above-mentioned case of fusing.

Figure 12:
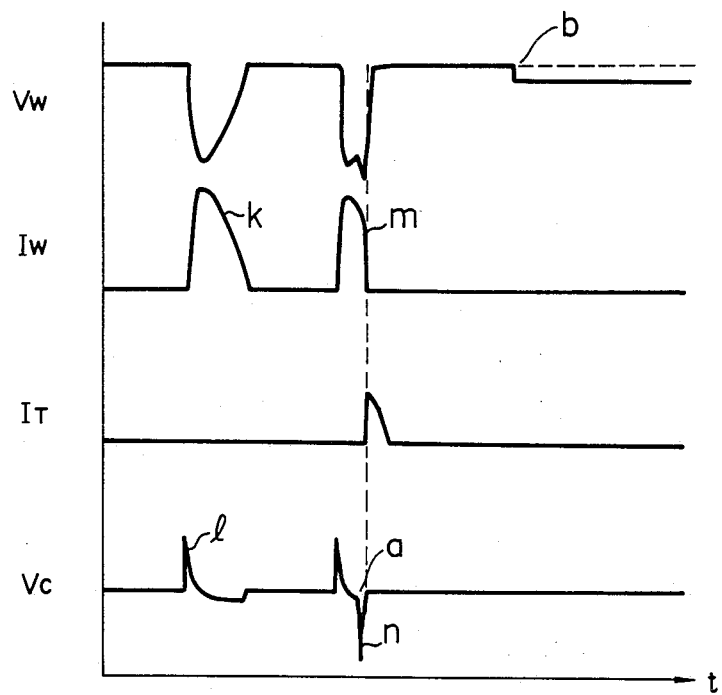
FIG. 12 is a diagram for explaining the control operation of the third embodiment of FIG. 11.

FIG. 12 shows changes with time of the heating current Iw for the additive wire 6, the output terminal voltage Vw of the heating power supply, the current It flowing in the thyristor 28 and the output voltage Vc of the sensor 27 for producing a differentiation of the wire current Iw for the apparatus shown in FIG. 11. At the time point a immediately before fusing by excessive heat, the resistance value of the filler wire 6 in the extension e sharply increased due to the rise in specific resistance with temperature increase and reduction in sectional area with the result that the wire current Iw sharply decreases, and at the same time a lower load reduces the voltage drop in the power supply, resulting in an increased output terminal voltage Vw.

The current waveform with the wire 6 energized in contact with the base metal 3 is shown by k in FIG. 12, and a differentiated waveform thereof designated by numeral 1. When the wire 6 is almost near the fusing state by being overheated during energization of the wire 6, the wire current decreases considerably quicker than under normal conditions. As a result, the differentiation waveform of the wire current detected by the current differentiation sensor 27, unlike the wire energization waveform 1 under normal conditions, takes a form of a sharp high level as shown by n. A comparator with a threshold level slightly higher than the output under normal conditions of the differentiation sensor 27 is disposed in the fusing detection control circuit 26 and supplied with the signal output n, thereby easily detecting that the wire 6 is likely to be fusing.

In view of the fact that the wire resistance sharply increases causing a change in current and voltage in this way immediately before fusing, the condition immediately before fusing can be detected with considerable accuracy.

In FIG. 12 when it is detected that the condition immediately before fusing exists near the time point a, the energization of the wire is stopped at once. At this time the wire is retained to be contacted with the base metal 3, and the wire is detached from the base metal 3 at the time point b. As the wire is not energized at the time point b, any spatter is not generated when the wire is detached from the base metal.

Actually, in the prior art, it takes 0.8 milli-seconds for the wire current to be reduced to zero from 0.8 ms fusing start. According to third embodiment using the shorting of a thyristor by contrast, the wire current is reduced to zero within 0.1 millisecond after fusing start.

As explained above, according to the third embodiment of the present invention, the wire current is reduced to zero within a very short time a compared with the conventional method after wire fusion, and therefore the spatters, which otherwise is caused by fusing of the overheated wire 6, is extremely reduced. In an advantage specific to the third embodiment, the wire 6 is fused to place the thyristor in conductive state, so that the energization continues till the zero cross point with a current waveform substantially similar to the normal waveform of the curren flowing in the main transformer 15, after which the energization is prohibited at the primary triac 16 again before the tip of the wire 6 comes into contact with the base metal 3. As a result, the imbalance in current between the positive and negative half waves of the current flowing in the main transformer 15 is reduced further, thereby leading to the advantage of lesser cases of magnetic polarization the main transformer due to the DC components.

Figure 13:
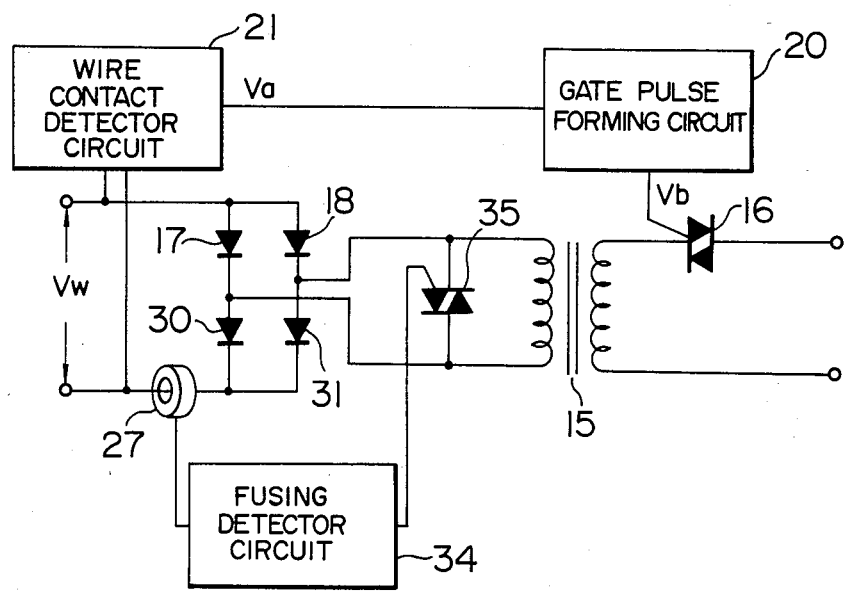
FIG. 13 is a diagram showing a fourth embodiment of the wire-heating power supply and the control circuit according to the present invention.

FIG. 13 shows a fourth embodiment of the wire-heating power supply and the control circuit according to the present invention. A triac 35 is connected to the secondary output terminal of a main transformer 15 and the secondary output immediately after fusing is shorted at the moment of the fusing to reduce the current supplied to the wire.

The present invention is not limited to the above-mentioned wire-heating power supply using a triac in most cases, but may be applied with equal effect to a wire-heating power supply of inverter type, etc. using a transistor.

Figure 14:
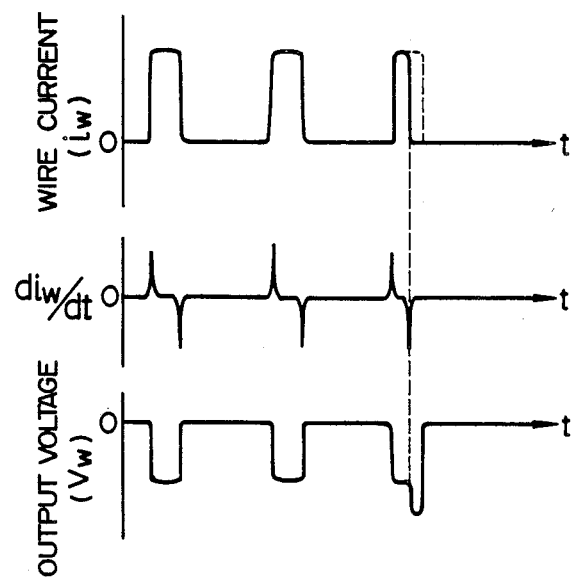
FIG. 14 is a diagram waveforms of wire-heating power supply and an output voltage in the case where a circuit of inverter type is used as the wire-heating power supply according to a fifth embodiment of the present invention.

As a fifth embodiment of the present invention, FIG. 14 shows an example of a wire current waveform Iw and an output voltage waveform Vw of a circuit of inverter type used as a wire-heating power supply. These waveforms basically take a current waveform similar to square wave, and the wire current is reduced considerably rapidly at the time of fusing of the wire energized and overheated. Therefore, it is also possible to detect near the moment of the fusing easily from a differentiated current waveform, thus making it possible to de-energize the wire 6 promptly by use of the primary transistor for high-speed switching such as at 20 KHz. In spite of the periodical reduction in current due to a pulse current form, the normal pulse current form is not affected at all even if the periodical reduction is detected erroneously as an overheated fusing signal.

Apart from the foregoing description of the detection of fusing by overheating of the wire 6 from a differentiate waveform of the wire current, similar detection is also possible from the change in wire voltage Vw as shown in FIG. 14 in the case where the wire current takes a form similar to a square wave like in the inverter power supply. Specifically, when the secondary current decreases with the approach of fusing by overheating, the voltage drop in the heating power supply and in the power cables decreases and the secondary output terminal voltage of the power supply rises, so that detection is possible from a change in the differentiated or absolute value of the output voltage immediately before or at the moment of fusing.

Also, the invention may be embodied as a filler wire heating power supply for producing a continuous AC current or continuous DC current has so far been normally used for the hot-wire welding process. As still another alternative, a filler wire-heating power supply for producing an AC pulse current may be also used.

Instead of the above-mentioned combination of the hot-wire heating power supply with the TIG arc for hot-wire TIG arc welding process, the present invention may be applied also to a hot-wire welding process combining a consummable electrode arc for the hot-wire welding process in which spatter does not damage the electrode, thus substantially eliminating spatters from the hot wire.

The wire terminal voltage Vw, which is generally detected between the base metal 3 and a contact tip for energizing the wire 6, may alternatively be detected as an output terminal voltage of the wire-heating power supply.

It will thus be understood from the foregoing description that according to the present invention, manual operation is substantially eliminated for keeping an optimum wire-heating power in the hot-wire welding process. More specifically, a proper wire-heating power can be stably and automatically maintained regardless of changes in such conditions a welding factors for the hot-wire welding process including arc current, arc length, material or shape or feed rate of the filler wire, extension or the position or angle of insertion into the molten pool. As a consequence, the disadvatage of the hot-wire TIG welding process in which an unmolten wire liable to be formed remains in the weld metal is completely eliminated. Further, a proper heating power is kept automatically by matching these various chnages in welding conditions, thereby greatly facilitating the semi-automatic hot-wire welding operation which has so far encountered considerable difficulties.

Further, in the prior art control system for supplying the wire-heating power corresponding to the wire feed rate, a power detection device comprising a Hall element or the like for detecting the wire-heating power in addition to a wire feed rate detector, and also, it is necessary to detect the wire voltage by such a detector placed as near to the ends of the extension as possible to determine a heating power as accurate as possible, thereby complicating the wiring work for the welding process. In many embodiments of the present invention, in contrast, detection of the wire-heating power is not required, but it is only necessary to detect the output terminal voltage of the wire-heating power supply in place of the voltage across the extension, thus greatly simplifying the control device and reducing it's cost.

Furthermore, according to the present invention, a proper wire-heating power is maintained full automatically, and spatters are virtually eliminated, thereby making possible continuous hot-wire welding work over a long time.

We claim:

1. A method of controlling a hot-wire welding apparatus which comprises an arc power supply source, an arc electrode connected to said arc power supply source, a filler wire delivered to a location where an arc is produced to form a molten pool with a base material, and a wire-heating power supply source for heating said filler wire by electrical energization thereof, said method comprising the steps of:
    (a) increasing progressively an electric heating power supplied from said wire-heating power supply source for heating said filler wire until said filler wire is brought to a fusing state where fusing of said filler wire occurs or can immediately occur;
    (b) detecting occurrence of said fusing state;
    (c) decreasing said electric heating power supplied to said filler wire to a predetermined level at the moment when said fusing state is detected;
    (d) increasing progressively said electric heating power again until said filler wire is again brought to said fusing state; and
    (e) repeatedly executng said steps (a), (b), (c) and (d) in sequence.

2. A hot-wire welding apparatus, comprising:
an arc power supply source;
an arc electrode electrically connected to said arc power supply source;
a filler wire supplied to a location where an arc is produced to form a molten pool wit a base material;
a wire-heating power supply source for heating said filler wire by electrical energization thereof, said wire-heating power supply source including a switching element, an inhibit circuit for inhibiting said electrical energization for a predetermined period through said switching element, and a heating circuit for electrically heating said filler wire until said filler wire is brought to a fusing state in which fusing of said filler wire occurs or can immediately occur;
detecting circuit means for detecting a change in said electrical energization indicating said fusing state and for producing a detection signal indicative thereof; and
control circuit means for casing said inhibit circuit to reduce rapidly or stop said electrical energization of said filler wire through said switching element in response to said detection signal for a pedetermined period.

3. A hot-wire welding apparatus according to claim 2, wherein said wire heating power supply source includes one of a continuous DC power source, a pluse-like DC power source, a continuous AC power and a pluse-like AC power source.

4. A hot-wire welding apparatus according to claim 2, wherein said detecting means incudes a wire current differential sensor for differentiating a waveform of a current flowing through said filler wire to thereby produce a differentiated wire current signal, and a comparator for comparing said differentiated wire current signal with a preset reference signal to thereby produce an output signal indicative of said fusing state when a level of said reference signal is exceeded by said differentiated wire current signal; and
    said control circuit means causing said inhibiting circuit to inhibit said electrical energization of said filler wire through said switching element in response to the output signal of said comparator indicative of said frequency state.

5. A hot-wire welding apparatus according to claim 2, wherein said wire heating power supply source includes a transformer having a primary circuit in which said switching element is connected, said transformer having a secondary circuit in which another switching element is connected in parallel with said filler wire;
    said another switching element responsive to the output signal of said wire energization inhibiting circuit to inhibit the electrical energization of said filler wire of said filler wire for a predetermined period.

6. A hot-wire welding apparatus according to claim 5, wherein said switching element is constituted by a triac having a firing angle controlled by said control circuit means, and said another switching element is constituted by a thyristor.

7. A hot-wire welding apparatus according to claim 2, wherein said detecting means includes a wire voltage detecting sensor for detecting a change in a voltage appearing on said filler wire during electrical energization thereof for producing a voltage signal indicative thereof and a comparator for comparing said voltage signal with a present reference signal to thereby produce an output signal indicative of said fusing state when a level of said reference signal is exceeded by said voltage signal; and
    said control circuit means causing said inhibit circuit to inhibit said electrical energization of said filler wire through said switching element in response to the output signal of said comparator indicative of said fusing state.

8. A hot-wire welding apparatus according to claim 2, wherein said detecting means includes a wire voltage detecting sensor for detecting a change in a voltage appearing on said filler wire during an electrical de-energization period and providing an output voltage indicative thereof and a comparison circuit for comparing the output voltage of said wire voltage detecting sensor and a preset reference voltage and providing an output signal; and
    said control circuit means controlling said inhibit circuit such that when the output signal of said comparison circuit indicates that said filler wire is out of contact with said base material, the electircal energization of said filler wire is inhibited for a predetermined period inclusive of an electrical energization period succeeding said electrical de-energization period.

9. A hot-wire welding apparatus according to claim 8, further comprising a circuit for restarting the electrical energization of said filler wire after lapse of a predetermined period following the detection by said comparison circuit that said filler wire has come into contact with said base material again during said predetermined energization inhibited period.

10. A hot-wire welding apparatus according to claim 8, further comprising a circuit for restarting the electrical energization of said filler wire after feeding a predetermined amount of said filler wire after the detection by said comparison circuit that said filler wire has come into contact with said base material during said predetermined energizaiton-inhibited period.

11. A hot-wire welding apparatus according to claim 8, wherein said wire heating power supply source produces a pulsed current in accordance with a control signal produced by a circuit for determining a wire de-energization period and a wire energization period, said control circuit means further enabling separation of said filler wire from said base material to take place when the instantaneous value of said wire current is not more than 100A or when said filler wire is electrically de-energized.

12. A hot-wire welding apparatus, comprising:
an arc power supplly source;
an arc electrode electrically connected to said arc power supply source;
a filler wire supplied to a location where an arc is produced to form a molten pool with a base material;
a wire-heating power supply source for heating said filler wire by electrical energizaiton thereof, said wire-heating power supply source including a switching element and a controller for controlling said switching element such that said electrical energizaiton of said filler wire is interrupted at a predetermined de-energizaiton interval;
control circuit means for controlling the electrical energization of said filler wire such that said filler wire is heated until said filler wire is brought to a fusing state where fusing of said filler wire occurs or can immediately occur;
wire fusing detecting circuit means for detecting a change in said electrical energization indicating said fusing state and for producing a first detection signal indicative thereof;
wire contact detecting circuit means including a comparison circuit for comparing the wire voltage appearing on said filler wire during the wire energization period with a reference voltage signal for producing a comparison output signal indicating that said filler wire is in contact with said base material or said filler wire is out of contact with said base material;
wire energization inhibiting circuit means responsive to the first detection signal from said wire fusing detecting circuit means and said comparison output signal from said wire contact detecting circuit means for producing a wire energizaiton inhibit signal for causing said switching element to interrupt the current conduction for a predetermined period when the first detection signal of said wire fusing detecting circuit means indicates the fusing of said filler wire during said energization period;
said wire contact detecting circuit means further detecting a change in a voltage appearing on said filler wire during said electrical de-energization period for producing a second detection signal;
said wire energization inhibiting circuit means being responsive to the second detection signal such that when the comparison output signal of said comparison circuit indicates that said filler wire is out of contact with said base material during said electrical de-energizaiton period, the electircal energization of said filler wire is inhibited for a predetermined period inclusive of the electrical energization period after said electrical de-energizaiton period;
a voltage increasing rate and voltage reduction rate setting circuit for setting a rate at which said electrical energization of said filler wire is increased and a range in which said electrical energization of said filler wire is enabled to be decreased and for providing output signals indicative thereof; and
wire heating power control circuit means for receiving the output signals from said voltage increasing rate and voltage reduction range setting circuit and the comparison output signal and for producing a control command signal to said controller of said wire heating power supply source in accordance therewith.

13. A hot-wire welding apparatus according to claim 12, wherein said wire heating power supply source includes one of a continuous DC power source, a pulse-like power source, a continuous AC power source, and a pulse-like AC power source.

14. A hot-wire welding apparatus according to claim 12, wherein said control circuit means controls the power for heating said filler wire so that the heating power for the filler wire is increased until said filler wire reaches said fusing state, subsequently decreased to a predetermined value when said fusing state has been reached, maintained at said predetermined value for a predetermined length of time, and again increased to thereby repeat the fusing of said filler wire.

15. A hot-wire apparatus according to claim 12, further comprising a circuit for forming a reference time interval, and a wire heating power control circuit for increasing the increase rate of wire heating power when the time interval at which the first and second detection signals from said wire fusing detecting circuit means and said wire contact detecting circuit means are produced becomes longer than said reference time interval and for reducing the increase rate of said wire heating power when the time interval becomes shorter than said reference time interval.

16. A hot-wire welding apparatus according to claim 12, further comprising:
a circuit for forming a reference time interval, and
a wire heating power control circuit for increasing the wire heating power by a predetermined amount when the time interval at which the first and second detection signals of said fusing detecting circuit means and said wire contact detecting circuit means are produced becomes longer than said reference time interval, and for reducing the wire heating power by a predetermined amount when the time interval becomes shorter than said reference time interval.

17. A hot-wire welding apparatus according to claim 12, further comprising a circuit for producing a signal representative of proportionality between the wire heating power of the square of the effective value of said wire heating current and the filler wire feed rate, and
a circuit for controlling the power applied to the wire in accordance with said proportionality signal.

18. A hot-wire welding apparatus according to claim 12, wherein said wire heating power supply source produces a continuous DC Current for heating said filler wire, said continuous DC current being interrupted by said switching element.

19. A hot-wire welding apparatus according to claim 12, wherein said wire heating pulse power supply source includes a transformer having a primary circuit in which said switching element constituted by a triac having a firing angle controlled by said controller is connected, said transformer having a secondary circuit in which another switching element constituted by a thyristor is connected in parallel with said filler wire;

said another switching element being responsive to an output of said wire energization inhibiting circuit means for inhibiting the electrical enregization of said filler wire for the predetermined period.

20. A hot-wire welding apparatus according to claim 12, wherein said wire fusing detecting circuit means includes a wire current differential sensor for detecting a differentiated waveform of wire current and for providing an output signal indicative thereof, and a second comparison circuit for comparing the output signal of said sensor with a first reference signal to thereby produce said first detection signal.

21. A hot-wire welding apparatus according to claim 12, wherein said wire fusing detecting circuit means includes a wire voltage sensor for detecting change in a voltage appearing on said filler wire and for providing an output signal indicative thereof, and a comparison circuit for comparing the output signal of said sensor with a first reference signal to thereby produce said first detection signal.

* * * * *